United States Patent
Amayeh et al.

(10) Patent No.: US 10,089,526 B2
(45) Date of Patent: Oct. 2, 2018

(54) EYELID SHAPE ESTIMATION

(71) Applicant: Magic Leap, Inc., Dania Beach, FL (US)

(72) Inventors: Gholamreza Amayeh, Santa Clara, CA (US); Adrian Kaehler, Los Angeles, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 15/238,549

(22) Filed: Aug. 16, 2016

(65) Prior Publication Data
US 2017/0053166 A1 Feb. 23, 2017

Related U.S. Application Data

(60) Provisional application No. 62/208,142, filed on Aug. 21, 2015.

(51) Int. Cl.
*G06K 9/00* (2006.01)

(52) U.S. Cl.
CPC ....... *G06K 9/0061* (2013.01); *G06K 9/00597* (2013.01)

(58) Field of Classification Search
CPC .......... G06K 9/00597–9/00617; G02B 27/017
See application file for complete search history.

(56) References Cited

U.S. PATENT DOCUMENTS

| | | |
|---|---|---|
| 5,291,560 A | 3/1994 | Daugman |
| 5,583,795 A | 12/1996 | Smyth |
| 5,719,951 A * | 2/1998 | Shackleton ........ G06K 9/00221 375/E7.026 |
| 5,774,591 A | 6/1998 | Black et al. |
| 6,095,989 A | 8/2000 | Hay et al. |
| 6,154,559 A | 11/2000 | Beardsley |
| 6,463,176 B1 | 10/2002 | Matsugu et al. |

(Continued)

FOREIGN PATENT DOCUMENTS

| | | |
|---|---|---|
| FR | 2915301 | 10/2008 |
| JP | 2006-120006 A | 5/2006 |

(Continued)

OTHER PUBLICATIONS

Annapoorani et al "Accurate and Fast Iris Segmentation" International Journal of Engineering Science and Technology 2010.*

(Continued)

*Primary Examiner* — Sean Motsinger
(74) *Attorney, Agent, or Firm* — Knobbe, Martens, Olson & Bear, LLP

(57) ABSTRACT

Systems and methods for eyelid shape estimation are disclosed. In one aspect, after receiving an eye image of an eye (e.g., from an image capture device), an eye-box is generated over an iris of the eye in the eye image. A plurality of radial lines can be generated from approximately the center of the eye-box to an upper edge or a lower edge of the eye box. Candidate points can be determined to have local maximum derivatives along the plurality of radial lines. From the candidate points, an eyelid shape curve (e.g., for an upper eyelid or a lower eyelid) can be determined by fitting a curve (e.g., a parabola or a polynomial) to the candidate points or a subset of the candidate points.

18 Claims, 7 Drawing Sheets

(56) References Cited

U.S. PATENT DOCUMENTS

| | | | |
|---|---|---|---|
| 7,480,396 B2 | 1/2009 | Teiwes et al. | |
| 7,682,026 B2 | 3/2010 | Huffman et al. | |
| 8,077,914 B1 | 12/2011 | Kaplan | |
| 8,403,479 B2 | 3/2013 | Potze et al. | |
| 8,693,745 B2 | 4/2014 | Izatt et al. | |
| 8,854,491 B2 | 10/2014 | Ford et al. | |
| 8,950,867 B2 | 2/2015 | Macnamara | |
| 9,215,293 B2 | 12/2015 | Miller | |
| 9,310,559 B2 | 4/2016 | Macnamara | |
| 9,348,143 B2 | 5/2016 | Gao et al. | |
| D758,367 S | 6/2016 | Natsume | |
| 9,417,452 B2 | 8/2016 | Schowengerdt et al. | |
| 9,671,566 B2 | 6/2017 | Abovitz et al. | |
| 9,791,700 B2 | 10/2017 | Schowengerdt et al. | |
| 2003/0169907 A1* | 9/2003 | Edwards | G06K 9/00248 382/118 |
| 2005/0069207 A1 | 3/2005 | Zakrzewski et al. | |
| 2006/0147094 A1 | 7/2006 | Yoo | |
| 2006/0165266 A1 | 7/2006 | Hamza | |
| 2006/0188144 A1* | 8/2006 | Sasaki | G06K 9/00281 382/154 |
| 2006/0203088 A1* | 9/2006 | Hammoud | G06K 9/00597 348/78 |
| 2006/0239670 A1 | 10/2006 | Cleveland | |
| 2006/0280340 A1 | 12/2006 | Derakhshani et al. | |
| 2007/0140531 A1* | 6/2007 | Hamza | G06K 9/00597 382/117 |
| 2007/0274570 A1 | 11/2007 | Hamza | |
| 2008/0002262 A1 | 1/2008 | Chirieleison | |
| 2008/0069411 A1 | 3/2008 | Friedman et al. | |
| 2008/0151186 A1* | 6/2008 | Adachi | A61B 3/113 351/206 |
| 2008/0226138 A1* | 9/2008 | Suzuki | A61B 3/10 382/117 |
| 2008/0232650 A1* | 9/2008 | Suzuki | G06K 9/00281 382/118 |
| 2008/0253622 A1 | 10/2008 | Tosa et al. | |
| 2009/0175537 A1* | 7/2009 | Tribelhorn | G06K 9/00463 382/173 |
| 2009/0244274 A1* | 10/2009 | Morita | G06K 9/00248 348/78 |
| 2009/0252382 A1* | 10/2009 | Liu | G06K 9/0061 382/117 |
| 2009/0310829 A1 | 12/2009 | Baba et al. | |
| 2010/0054548 A1* | 3/2010 | Inada | G06K 9/0061 382/117 |
| 2010/0202669 A1 | 8/2010 | Hollingsworth et al. | |
| 2011/0150334 A1 | 6/2011 | Du et al. | |
| 2011/0153287 A1 | 6/2011 | Potze et al. | |
| 2011/0280454 A1 | 11/2011 | Su et al. | |
| 2012/0127062 A1 | 5/2012 | Bar-Zeev et al. | |
| 2012/0163678 A1* | 6/2012 | Du | G06K 9/0061 382/117 |
| 2012/0219189 A1 | 8/2012 | Wu et al. | |
| 2013/0082922 A1 | 4/2013 | Miller | |
| 2013/0125027 A1 | 5/2013 | Abovitz | |
| 2013/0169530 A1 | 7/2013 | Bhaskar et al. | |
| 2013/0169683 A1* | 7/2013 | Perez | G02B 27/02 345/633 |
| 2014/0023240 A1 | 1/2014 | Venkatesha et al. | |
| 2014/0071539 A1 | 3/2014 | Gao | |
| 2014/0072230 A1* | 3/2014 | Ruan | G06K 9/0061 382/199 |
| 2014/0133705 A1 | 5/2014 | Hanita et al. | |
| 2014/0147022 A1 | 5/2014 | Zhou et al. | |
| 2014/0161317 A1* | 6/2014 | Hiramaki | G06K 9/0061 382/103 |
| 2014/0177023 A1 | 6/2014 | Gao et al. | |
| 2014/0177906 A1 | 6/2014 | Horowitz | |
| 2014/0218468 A1 | 8/2014 | Gao et al. | |
| 2014/0267771 A1 | 9/2014 | Lawler | |
| 2014/0285404 A1* | 9/2014 | Takano | G06F 3/005 345/8 |
| 2014/0300867 A1 | 10/2014 | Fassi et al. | |
| 2014/0306866 A1 | 10/2014 | Miller et al. | |
| 2015/0016777 A1 | 1/2015 | Abovitz et al. | |
| 2015/0103306 A1 | 4/2015 | Kaji et al. | |
| 2015/0178939 A1 | 6/2015 | Bradski et al. | |
| 2015/0205126 A1 | 7/2015 | Schowengerdt | |
| 2015/0222883 A1 | 8/2015 | Welch | |
| 2015/0222884 A1 | 8/2015 | Cheng | |
| 2015/0268415 A1 | 9/2015 | Schowengerdt et al. | |
| 2015/0302652 A1 | 10/2015 | Miller et al. | |
| 2015/0346490 A1 | 12/2015 | TeKolste et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2016/0063303 A1 | 3/2016 | Cheung et al. | |
| 2016/0085299 A1 | 3/2016 | Horesh | |
| 2016/0302971 A1 | 10/2016 | Morley et al. | |
| 2017/0053165 A1* | 2/2017 | Kaehler | G02B 27/017 |
| 2017/0053166 A1* | 2/2017 | Amayeh | G06K 9/00617 |
| 2017/0109580 A1 | 4/2017 | Kaehler et al. | |

FOREIGN PATENT DOCUMENTS

| | | |
|---|---|---|
| WO | WO 2017/034860 | 3/2017 |
| WO | WO 2017/034861 | 3/2017 |
| WO | WO 2017/066296 | 4/2017 |

OTHER PUBLICATIONS

Daugman, J., "Epigenetic randomness, complexity and singularity of human iris patterns", Proc Biol Sci., 268(1477), Aug 22, 2001, 1737-1740.

Daugman, J., "How Iris Recognition Works", IEEE Transactions on Circuits and Systems for Video Technology, vol. 14, No. 1, Jan. 30, 2004, in 10 pages.

Daugman, J., "New Methods in Iris Recognition", IEEE Transactions on Systems, Man, and Cybernetics—Part B: Cybernetics, vol. 37, No. 5, Oct. 2007, 1167-1175.

Alonso-Fernandez, F. et al., "Iris Recognition Based on SIFT Features", 2009 International Conference on Biometrics, Identity and Security (BldS), Sep. 22-23, 2009, in 28 pages.

Hansen, D. et al., "In the Eye of the Beholder: A Survey of Models for Eyes and Gaze", IEEE Transactions on Pattern Analysis and Machine Intelligence, vol. 32, No. 3, Mar. 2010, in 23 pages.

Derpanis, K., "Overview of the Ransac Algorithm", May 13, 2010, in 2 pages, http://www.cse.yorku.ca/~kosta/CompVis_Notes/ransac.pdf.

Rublee, E. et al., "ORB: an efficient alternative to SIFT or SURF", Proceedings of the 2011 International Conference on Computer Vision, Nov. 6-13, 2011, in 8 pages.

Invitation to Pay Additional Fees for PCT Application No. PCT/US2016/047183, dated Oct. 3, 2016.

International Search Report and Written Opinion for PCT Application No. PCT/US2016/047183, dated Dec. 15, 2016.

Daugman, J., "Probing the Uniqueness and Randomness of IrisCodes: Results From 200 Billion Iris Pair Comparisons," Proceedings of the IEEE, vol. 94, No. 11, Nov. 2006, in 9 pages.

Li, D. et al., "Starburst: A hybrid algorithm for video-based eye tracking combining feature-based and model-based approaches", IEEE CVPR Workshop on V4HCI, Jun. 2005, in 8 pages.

International Preliminary Report on Patentability, re PCT Application No. PCT/US2016/047183, dated Mar. 8, 2018.

* cited by examiner

EYELID SHAPE ESTIMATION

CROSS-REFERENCE TO RELATED APPLICATIONS

This application claims the benefit of priority under 35 U.S.C. § 119(e) to U.S. Provisional Application No. 62/208,142, filed on Aug. 21, 2015, entitled "EYELID SHAPE ESTIMATION," which is hereby incorporated by reference in its entirety.

BACKGROUND

Field

The present disclosure relates generally to systems and methods for processing eye imagery.

Description of the Related Art

The human iris can be used as a source of biometric information. Biometric information can provide authentication or identification of an individual. The process of extracting biometric information, broadly called a biometric template, typically has many challenges.

SUMMARY

In one aspect, a method for eyelid shape estimation is disclosed. The method is performed under control of a hardware computer processor. The method comprises receiving an eye image from an image capture device; generating a shape around the iris of the eye, wherein the shape is tangent to the outermost bounds of the limbic boundary of the eye; generating lines extending from the center of the shape to edges of the shape; applying an edge detection algorithm to the eye image (e.g., the lines extending from the center of the shape) to determine candidate points for a boundary of an eyelid and an iris of the eye; and fitting an eyelid shape curve to at least two candidate points. In another aspect, the method for eyelid shape estimation can be performed by a head mounted display system. In yet another aspect, fitting the eyelid shape curve comprises sampling randomly at least two of the candidate points to select a plurality of candidate points for fitting; and forming a curve with the plurality of candidate points. In some aspects, the number of candidate points is at least three, at least four, at least five, or more. The number of candidate points may depend on a number of degrees of freedom in the candidate contour (e.g., three in the case of a parabola), any constraints (e.g., symmetry) that apply to the eyelid shape curve, and so forth.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

Figure 1:
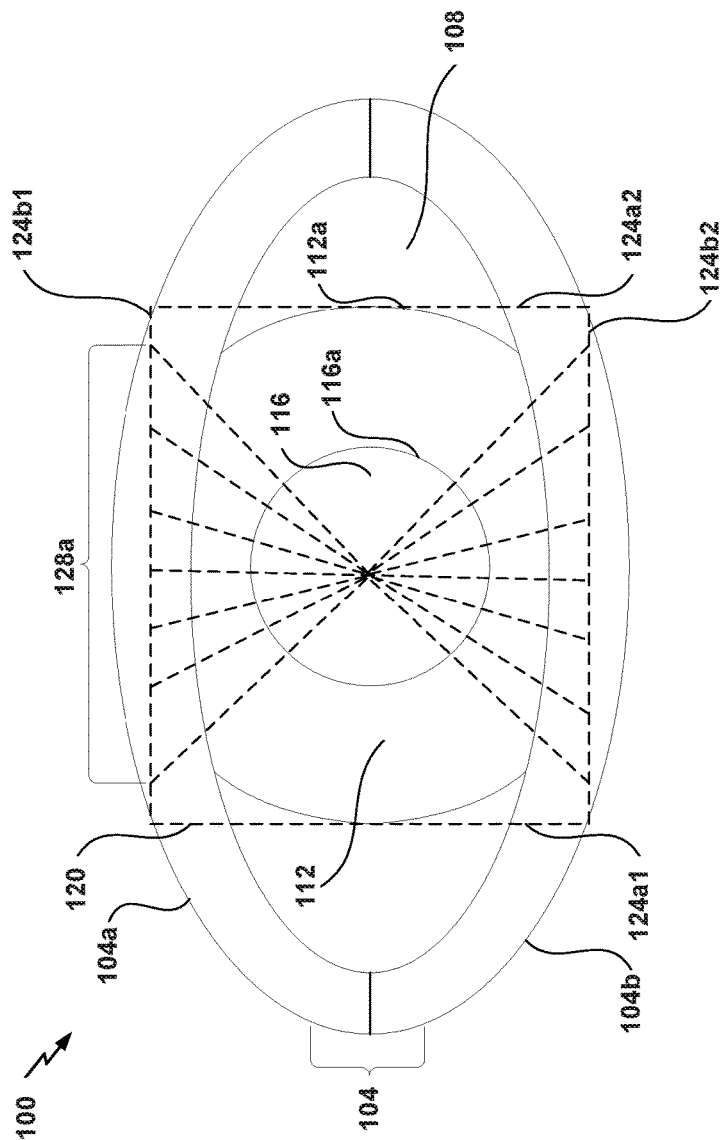
FIG. 1 schematically illustrates an example of an eye and an eye-box having a plurality of radial lines that intersect the eyelids.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

Extracting biometric information from an eye generally includes a procedure for the segmentation of the iris within an eye image. Iris segmentation can involve operations including locating the iris boundaries, including finding the pupillary and limbic boundaries of the iris; localizing upper or lower eyelids if they occlude the iris; detecting and excluding occlusions of eyelashes, shadows, or reflections, and so forth. For example, the eye image can be included in an image of the face or may be an image of the periocular region of the eye. To perform iris segmentation, both the pupillary boundary (the interior boundary of the iris) and the limbic boundary (the exterior boundary of the iris) can be identified as separate segments of image data. In addition to this segmentation of the iris, the portion of the iris that is occluded by the eyelids (upper or lower) can be estimated. This estimation is performed because, during normal human activity, the entire iris of a person is rarely visible. In other words, the entire iris is not generally free from occlusions of the eyelids and eyelashes.

Estimating the portion of the iris occluded by the eyelids has presented challenges. Embodiments of eyelid shape estimation described herein advantageously can be used for estimating the portion of the iris occluded by eyelids. The eyelid shape estimation can be used, for example, to identify biometric traits (e.g., eyelid shape), or reconstruct poses or orientations of the body or parts of a body (e.g., an eye) from an analysis of an eye image. The eyelid shape estimation can be used to detect a blinking eye in an eye image. Since a blinking eye may occlude portions of the iris, detection of an eye blink, and removal of the corresponding eye image, may improve the quality of iris segmentation and iris authentication techniques. Also, by identifying an eyelid shape of an eye in an eye image, eyelid portions of the eye in the eye image can be removed to reduce the amount of calculations for iris segmentation techniques so that substantially only the iris portion of the eye is used for biometric authentication.

The present disclosure will describe the generation of an eye-box over an eye image including an eye. In various embodiments, the eye-box can be placed over the portion of the eye image. For example, an eye image can be obtained from a still image or a video. An eye-box can be generated over the eye image with a plurality of radial lines extending to the edge of the eye-box, for example, from the center of eye-box. The upper and lower edges of the eye-box can roughly trace the boundary between the eyelid (upper or lower respectively) with the iris. The eye-box can be used to assist in eyelid shape estimation.

As used herein, video is used in its ordinary sense and includes, but is not limited to, a recording of a sequence of visual images. Each image in a video is sometimes referred to as an image frame or simply a frame. A video can include a plurality of sequential frames, either with or without an audio channel. A video can include a plurality of frames, which are ordered in time. Accordingly, an image in a video can be referred to as an eye image frame or eye image.

The present disclosure will also describe examples of the estimation of an eyelid shape from an eye image. In some implementations, using an eye-box, candidate points can be determined with an edge detector. An iterative process can be used to randomly sample a subset of those candidate points to fit a curve (e.g., a parabolic line) to an estimated eyelid shape. Of the curves generated by this iterative process, scores for the curves can be determined using various methods (e.g., a measure of goodness of fit). A preferred curve can be determined by assessing which of the curves has the highest score and/or which of the curves exceeds a score threshold. Candidate points that are sufficiently far from the preferred curve (e.g., beyond a threshold distance) may be considered "outlier" points and excluded from subsequent fitting or analysis. The remaining candidate points can be considered to be "inlier" points. In some embodiments, the preferred curve can be refitted using some or all points that are considered to be "inlier" points, which can provide an improved or optimal curve that fits the eyelid (e.g., by excluding outlier points that likely are not representative of the position of the eyelid).

Example Eye-Box

FIG. 1 illustrates an image of an eye 100 with eyelids 104, sclera 108 (the "white" of the eye), iris 112, and pupil 116. Curve 116a shows the pupillary boundary between the pupil 116 and the iris 112, and curve 112a shows the limbic boundary between the iris 112 and the sclera 108. The eyelids 104 include an upper eyelid 104a and a lower eyelid 104b.

FIG. 1 also schematically illustrates an example of an eye-box 120 over the eye image of the eye 100 as well as a plurality of radial lines 128a. In various embodiments, the eye-box 120 can be overlaid on the eye 100 in the eye image using processes such as using an image processing algorithm that maps the eye-box 120 to particular portions of the eye image. Overlaying an eye-box 120 on the image of the eye 100 can also be referred to as generating an eye-box 120 or constructing an eye-box 120. As another example, the eye-box 120 can be overlaid on a video using processes such as using a video processing algorithm that can track an eye-box 120 through a plurality of sequential frames, and overlay the eye with an eye-box 120 as the video progresses through time. In some implementations, the eye-box 120 can be overlaid on the eye 100 in the eye image after a limbic boundary 112a or an approximation of the limbic boundary 112a is determined. For example, after determining the limbic boundary 112a, the eye-box 120 can be placed such that the limbic boundary is inside the boundary of the eye-box 120 overlaid on the eye image. The region of the iris 112 not covered by the eyelids 104 can be inside the boundary of the eye-box 120. As another example, after determining the approximation of the limbic boundary 112a, the eye-box 120 can be placed such that the approximation of the limbic boundary is inside the boundary of the eye-box 120 overlaid on the eye image. The region of the iris 112 not covered by the eyelids 104 or a majority of the region of the iris 112 not covered by the eyelids 104 can be inside the boundary of the eye-box 120.

The eye-box 120 can be rectangular in shape. In some implementations, the eye-box 120 can be sized so as to be a minimum size bounding box that includes the entire iris 112. For example, the eye-box 120 can be shaped so that vertical edges 124a1, 124a2 of the eye-box 120 are tangent to the outermost portions of the limbic boundary 112a of the iris 112. The eye-box 120 can be shaped so that the horizontal edge 124b1 (or 124b2) of the eye-box 120 extends substantially outside the boundary of the upper eyelid 104a (or the lower eyelid 104b) and iris 112. That is, the horizontal edge 124b1 (or 124b2) can intersect that boundary. But, as depicted in FIG. 1, the horizontal edge 124b1 (or 124b2) needs not intersect the boundary at any point. Similarly, the eye-box 120 can be shaped so that the horizontal edge 124b1 (or 124b2) extends beyond the boundary of the upper eyelid 104a (or the lower eyelid 104b) and the iris 112, at any intersecting point along that boundary. Accordingly, the shape of the eye-box 120 can change based on the edge of upper eyelid 104a or lower eyelid 104b that is occluding the iris 112. In some implementations, the eye-box 120 is cropped to be square. In other implementations, in which the perspective of the iris is deterministic, the eye-box may be shaped as a parallelogram. For example, a parallelogram can be determined from a perspective transformation applied to a square eye-box located in the plane of the iris.

With continuing reference to FIG. 1, a plurality of radial lines 128a can be generated from the pupil 116 (e.g., emanating from the center or around the center of the pupil 116) towards the top edge 124b1 of the eye-box 120 (for the upper eyelid 104a) or towards the bottom edge 124b2 of the eye-box 120 (for the lower eyelid 104b). Generating the plurality of radial lines 128a can also be referred to as constructing the plurality of radial lines 128a. A radial line 128a can be a line from the first pixel of the horizontal edge 124b1 closer to the upper eyelid 104a to the last pixel of the horizontal edge 124b2 closer to the lower eyelid 104b. A radial line 128a can be a line from the second pixel of the horizontal edge 124b1 closer to the upper eyelid 104a to the n−1 pixel of the horizontal edge 124b2 closer to the lower eyelid 104b, where n denotes the width of the eye-box 120.

The number of radial lines 128a (for each eyelid) may be as many as the width of the image, measured in pixels, or it may be a subsampling of this width. For example, a sampling process can be used to select certain radial lines to be used for eyelid shape estimation so that sufficient lines cross the eyelids to provide a good fit to the eyelid shape. The sampling process can sample according to a width pixel (e.g., 2, 5, 10, or more pixels) threshold that allows the eyelid shape to be estimated within a certain error threshold. Although seven radial lines are depicted in FIG. 1, this is for illustration, and in other implementations, any appropriate number of radial lines 128a can be utilized within the eye-box 120. For example, in one embodiment, the number of radial lines 128a can be the number of pixels in width across the eye image. In other embodiments, the number of radial lines 128a can be optimized to be the minimal number of lines that allow the eyelid shape to be estimated within a certain error threshold. In various embodiments, 3, 5, 7, 10, 15, 20, 30, or more lines can be used. The number of lines can be representative of the typical angular range subtended by an eyelid in an eye image, which is typically less than 180 degrees (for each eyelid).

Figure 2:
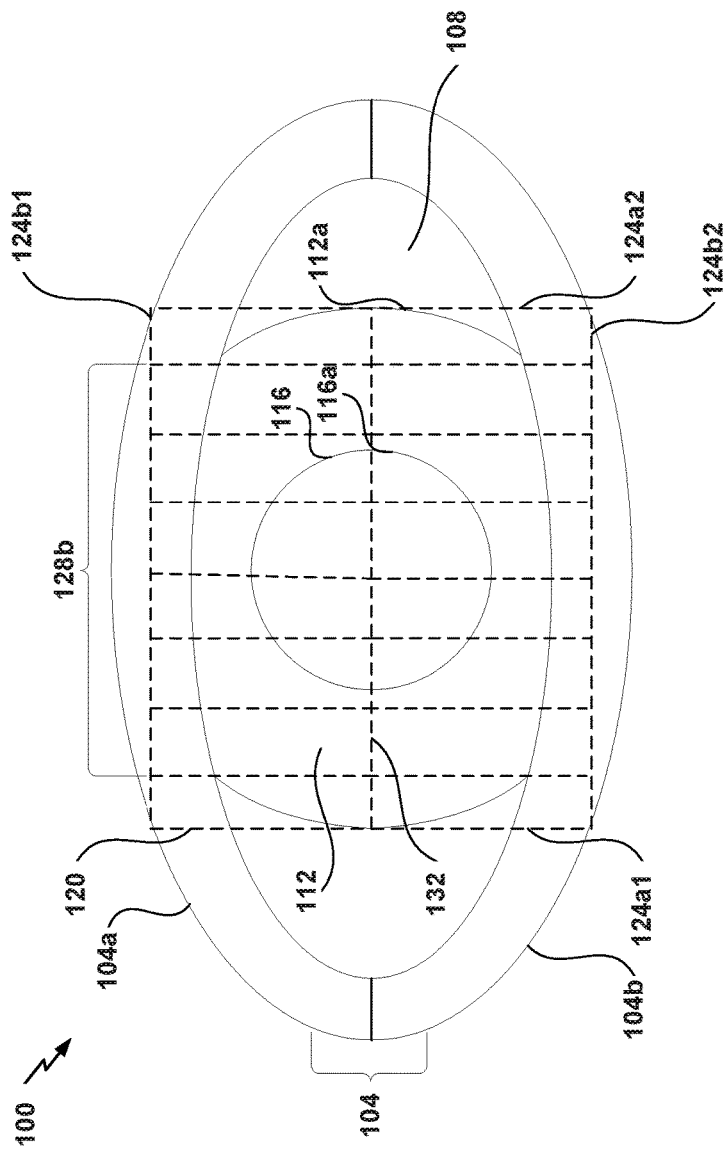
FIG. 2 schematically illustrates an example of an eye and an eye-box including a plurality of vertical lines that intersect the eyelids.

FIG. 2 schematically illustrates an example of an eye 100 and an eye-box 120 including a plurality of vertical lines 128b that intersect the eyelids 104. The plurality of vertical lines 128b can be used in place of or in addition to the plurality of radial lines 128a. The plurality of vertical lines 128a can be generated that are parallel to the vertical edges 124a1, 124a2 of the eye-box 120, emanating from a horizontal bisector line 132 of the pupil 116. In such a case, the number of lines (for each eyelid 104) can be as many as the width (in terms of pixels or any other suitable measurement such as millimeter) of the image. The number of lines can also be a subsampling of the width of the eye image.

In other implementations, a line with any shape that extends generally outward from the pupil 116 (or the horizontal bisector line 132) to meet or cross the eyelids 104 can be used. Thus, a line needs not be a straight line (radial or vertical) but can be curved or have any suitable shape.

As depicted, the eye-box 120 illustrated in FIG. 1 is rectangular in shape. However, in some implementations, the eye-box 120 can have shapes such as polygonal or geometrical shapes (e.g., circles, ovals, etc.) generated around the boundary of the iris 112. For example, a hexagonal shape can be used for the eye-box 120. Accordingly, "eye-box" can refer to any polygonal shape or geometric shape generated around the eye 100 so as to include the iris 112. In such a case, a plurality of lines that can be considered analogous to the plurality of radial lines 128a in FIG. 1 or the plurality of vertical lines 128b in FIG. 2 can be generated from the center or around the center of that polygonal shape to the edges of that polygonal shape.

Example Eyelid Shape Estimation

Figure 3:
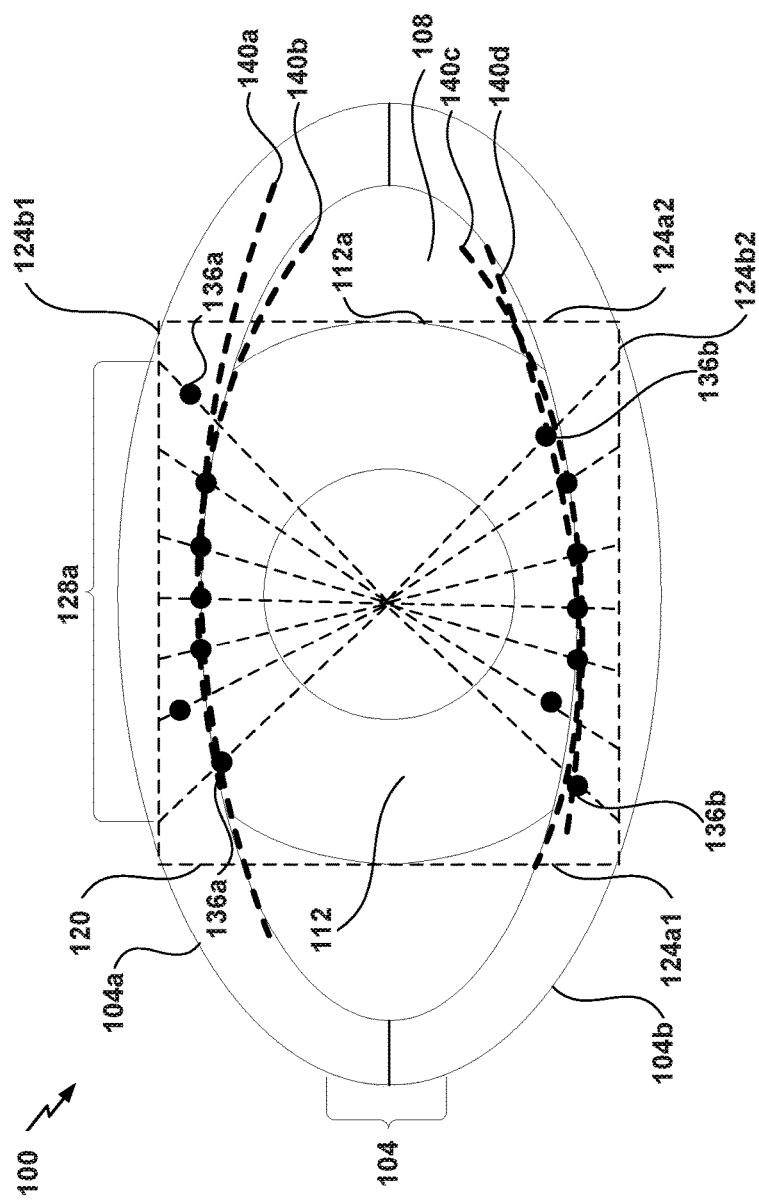
FIG. 3 schematically illustrates an example eyelid shape estimation.

FIG. 3 schematically illustrates an example of eyelid shape estimation. In various embodiments, eyelid shape estimation can also be referred to as eyelid shape determination. An example of eyelid shape determination will be discussed using the rectangular eye-box 120 and the plurality of radial lines 128a shown in FIG. 1. However, the technique can be performed using a non-rectangular eye-box 120 such as a hexagonal eye-box 120. And the technique can be performed using the plurality of vertical lines 128b shown in FIG. 2 or any shape of line.

A candidate point 136a (for estimating the shape of the upper eyelid 104a) or a candidate point 136b (for estimating the shape of the lower eyelid 104b) can be computed for each radial line 128a. A candidate point 136a or 136b can be a candidate for being a point along a portion of the edge of the eyelids 104a or 104b. For example, the candidate point 136a can be a candidate for estimating the shape of the upper eyelid 104a. Similarly, the candidate point 136b can be a candidate for estimating the shape of the lower eyelid 104b.

To determine these candidate points, for each radial line 128a, the point at which the maximum derivative is identified can be along the direction of the radial line 128a. In some implementations, for each vertical line 128b, the point at which the maximum derivative is identified can be along the direction of the vertical direction 128b. The maximum derivative can be used to find edges in the eye image, where there is a large change in image intensity, color, luminance, etc. A given line may have several points where the derivatives are large, e.g., the pupil boundary 116a, the limbic boundary 112a, and the eyelid 104a or 104b. A candidate point 136a or 136b can be selected as the point with a large derivative value (e.g., local maximum) and which has the largest distance from the center of the pupil 116 (or from the bisector line 132). The derivative can be determined using numerical methods. For example, in one embodiment, a Sobel derivative operator (or a linear combination thereof) is used to determine the derivative along the radial line 128a. As yet another example, a Gabor filter convolution can be used to determine a derivative for the line 128a. An edge detection algorithm (e.g., a Canny edge detector) can be used to identify the candidate points 136a or 136b for the eyelids (or for the pupillary and limbic boundaries).

In various embodiments, determining the maximum derivative can be viewed as applying an image processing filter to the plurality of radial lines 128a. For example, the filter can be represented as a discrete differentiation operator. This filter can be convolved with the eye image to generate an image processing result comprising the maximum derivatives (or approximations thereof). Accordingly, in one embodiment, the filter can be the Sobel filter operating using two 3×3 kernels that convolve the eye image to generate a derivative approximation result in two dimensions. Such a derivative approximation can be expressed as a magnitude and a direction. Points along the radial lines 128a or vertical lines 128b that have a locally maximum derivative magnitude can be selected as the candidate points 136a or 136b for the eyelids (e.g., after excluding points that may represent pupillary boundaries). Accordingly, FIG. 3 illustrates the detected candidate points 136a for the upper eyelid 104a and the detected candidate points 136b for the lower eyelid 104b.

In a non-limiting example implementation of estimating an eyelid shape, the eyelid shape can be represented by a conic form such as a parabola. As discussed below, other implementations are possible. The following fitting process described herein is illustrated with reference to a parabola fitting a conic form of candidate points so that the parabola represents an eyelid shape. This is for illustration and is not intended to be limiting. In other implementations, any suitable mathematical formulation or curve can be used during the fitting procedure. For example, a curve can be a non-linear mathematical expression. Different formulations or curves can be used for eyelids 104a or 104b.

Continuing in the example implementation of estimating the eyelid shape illustrated in FIG. 3, a parabola can be fitted to pass through three (or more) candidate points 136a or 136b. For example, a random subset of three candidate points 136a or 136b is drawn from the list of candidate points 136a (for the upper eyelid 104a) or 136b (for the lower eyelid 104b). The random subset can be selected via a random sampling process or method. A parabolic fit curve 140a can be made using the candidate points 136a in the random subset. In some implementations, multiple parabolic fit curves can be determined. As illustrated, a parabolic fit curve 140b shows another fit of the upper eyelid 104a using a different subset of the candidate points 136a. A parabolic fit curve 140c or 140d shows a fit of the lower eyelid 104b using a random subset of the candidate points 136b.

To determine a parabolic fit curve 104a for the candidate points 136a, a random sampling of subsets of candidate points 136a, as described above, can be repeated for a predetermined or fixed number of iterations to determine candidate points 136a for fitting the parabolic line 140a. In other embodiments, random subset sampling can be repeated until a parabolic fit curve 140a with more than a minimum number of inlier candidate points on (or sufficiently close to) that parabolic fit curve 140a is found. For example, a candidate point can be identified as an inlier if it is located within a threshold distance of the parabolic fit curve. As but one example, that distance can be in the range of 0.5 to 2.0 pixels. Different threshold distances are possible. In various embodiments, a combination of the above (e.g., fixed number of iterations and a minimum number of inlier candidate points) can be used during the random subset sampling of candidate points 136a or 136b.

In some embodiments, the parabolic fit curves 140a-140d are scored and compared to a score threshold. The score threshold can indicate an accurate estimation of the eyelid 104 shape within a certain error threshold. The Sobel derivative can be used to score the parabolic fit curves 140a-140d. For example, the parabolic fit curve 140a can be scored by summing the Sobel derivative along each candidate point 136a along the parabolic fit curve 140a. As another example of scoring, the parabolic fit curve 140a can be scored by counting the number of candidate points in total which are intersected by (or sufficiently close to, e.g., within a number of pixels) the parabolic fit curve 140a.

The scores for the parabolic fit curves 140a-140d can be used to identify a preferred parabolic line for the upper eyelid 104a or the lower eyelid 104b. For example, the parabolic fit curve with the highest score can be used to determine the preferred parabolic fit curve for that eyelid 104a or 104b. For example, if the parabolic fit curve 140a has a higher score than the parabolic fit curve 140b, the parabolic fit curve 140a can be determined to be the preferred parabolic fit of the upper eyelid 104a.

When the preferred parabolic fit curve is determined (e.g., with the highest score), the parabolic fitting can be repeated using not only the original subset of candidate points 136a or 136b or inlier points that are used to determine the preferred parabolic line, but some or all of the other candidate points 136a or 136b or inlier points. Such a refitting process may provide a more accurate estimation of an eyelid shape as compared to the actual measurement of the eyelid. On completion of this refitting process, the preferred parabolic fit curve can be determined to be most representative of the eyelid boundary and selected as that eyelid boundary.

During the fitting process described herein, a fit to a random subset of candidate points or inlier points may result in a line that is curved in the wrong direction for a particular eyelid. For example, an upper eyelid generally is curved downwards and a lower eyelid is generally curved upwards. If a fit line has the wrong curvature for a particular eyelid (e.g., an upward curvature for an upper eyelid or a downward curvature for a lower eyelid), the fit line can be rejected from the scoring process, thereby saving processing resources and improving efficiency of the process.

Accordingly, in some embodiments, a fit line can be rejected based on the sign of the curvature of the fit line; with positive curvatures being rejected for the upper eyelid 104a and negative curvatures being rejected for lower eyelid 104b. In various implementations, the curvature of the fit line is determined as part of the fitting process (e.g., a particular fitting coefficient may be representative of the curvature), or the curvature of the fit line can be determined by taking the second derivative of the function represented by fit line.

In some implementations, the eye image can optionally be pre-processed with a filter to remove high-frequency noise from the image. The filter can be a low-pass filter or a morphological filter such as an open filter. The filter can remove high-frequency noise from the limbic boundary, thereby removing noise that can hinder eyelid shape estimation.

Although the foregoing examples have been described in the context of fitting a parabola to an eyelid, this is for illustration and is not intended to be limiting. In other implementations, any suitable functional form for an eyelid shape can be used during the fitting procedure. The functional form for an upper eyelid 104a may, but need not, be different from the functional form for a lower eyelid 104b. The functional form for an eyelid can be a conic form (which includes a parabola as a particular case), a polynomial (e.g., with degree higher than two which is representative of the conic form), a spline, a rational function, or any other appropriate function. Further, in other implementations, the eyelid shape estimation technique may use a Random Sample Consensus (RANSAC) algorithm for fitting the candidate points 136a or 136b to the functional form for the eyelid 104a or 104b. The eyelid shape estimation technique may use other statistical or optimization algorithms to fit the eyelid shape to the candidate points 136a or 136b.

Example Eyelid Shape Estimation Process

Figure 4:
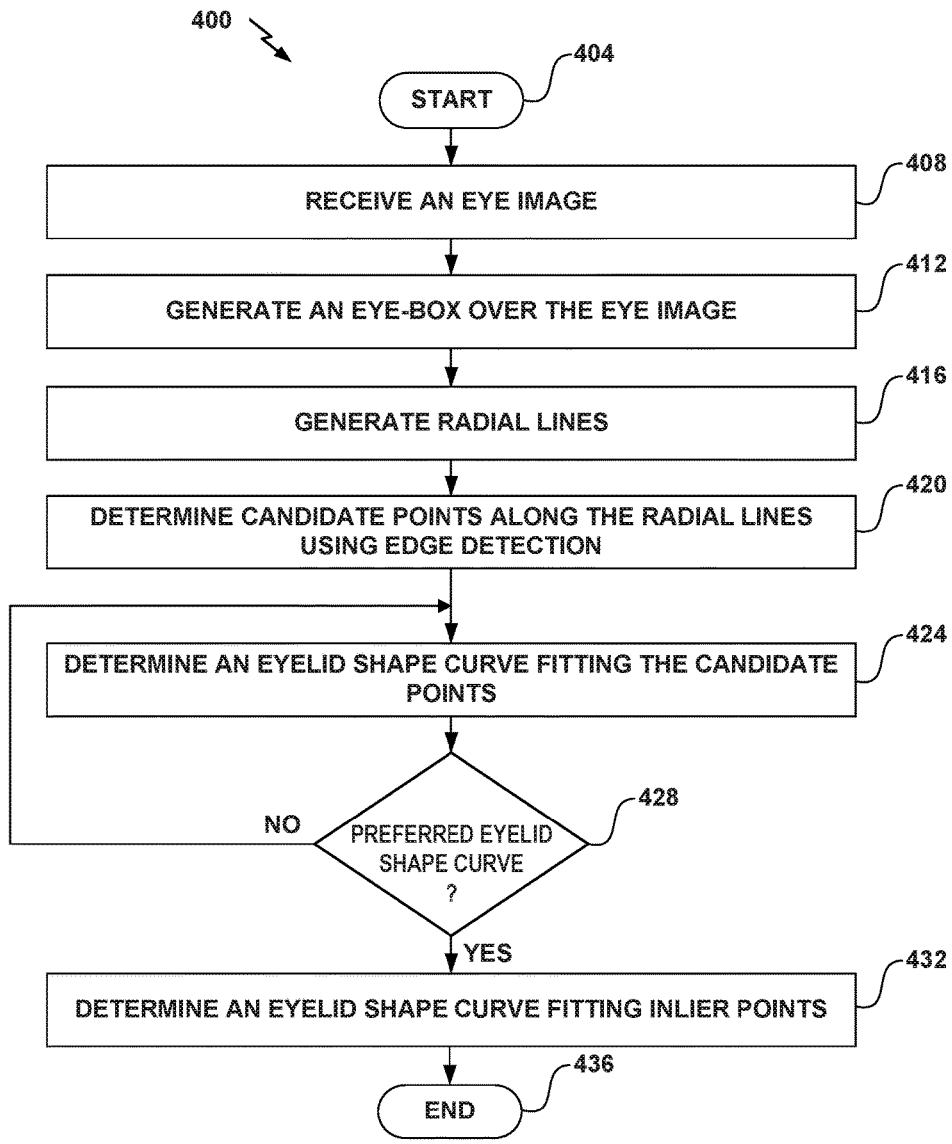
FIG. 4 is a flow diagram of an example process of eyelid shape estimation.

FIG. 4 is a flow diagram of an example process 400 of eyelid shape estimation. The process 400 can be implemented by a hardware processor, for example a hardware process of an augmented reality device. The process 400 begins at block 404. At block 408, an eye image is received. The eye image can be received from a variety of sources including an image capture device, a head mounted display system, a server, a non-transitory computer-readable medium, or a client computing device (e.g., a smartphone). The eye image can include eyelids 104, sclera 108 (the "white" of the eye), iris 112, and pupil 116 of an eye 100.

At block 412, an eye-box 120 can be generated over the eye 100 in the eye image. The eye-box 120 can be generated over the eye 100 in the eye image by overlaying the eye-box 120 over the eye 100 in the eye image. The eye-box 120 can be overlaid on the eye image by mapping the eye-box 120 to particular portions of the eye image. In some implementations, the eye-box 120 can be overlaid on the eye image computationally by a display system such as a head mounted display system. The eye-box 120 can be overlaid on the eye 100 in the eye image after a limbic boundary 112a or an approximation of the limbic boundary 112a is determined. For example, after determining the limbic boundary 112a, the eye-box 120 can be overlaid such that the limbic boundary 112a is inside the boundary of the eye-box 120 overlaid on the eye image. The region of the iris 112 not covered by the eyelids 104 can be inside the boundary of the eye-box 120. In some implementations, block 412 is optional, because the eye image may include only the particular portions of the eye 100 used for eyelid shape estimation. In some such implementations, one or more edges of the eye image function similarly to respective edges of an eye-box 120.

The eye-box 120 can be rectangular in shape. The eye-box 120 can be sized so as to be a minimum size bounding box that includes the entire iris 112. For example, the eye-box 120 can be shaped so that vertical edges 124a1, 124a2 of the eye-box 120 in FIGS. 1-2 are tangent to the outermost portions of the limbic boundary 112a of the iris 112. The eye-box 120 can be shaped so that the horizontal edge 124b1 (or 124b2) of the eye-box 120 extends substantially outside the boundary of the upper eyelid 104a (or the lower eyelid 104b) and iris 112 in FIGS. 1-2. Accordingly, the shape of the eye-box 120 can change based on the edge of the upper eyelid 104a or lower eyelid 104b that is occluding the iris 112.

In some embodiments, block 412 can be optional. The eye image received can include only portions of the eye 100. For example, the eye image can include portions of the eyelids 104, the sclera 108, the iris 112, and pupil 116 of the eye 100. As another example, the eye-box 120 can include the region of the iris 112 not covered by the eyelids 104. If the limbic boundary 112a or a portion of the limbic boundary 112a is inside the boundary of the eye-box 120, generating an eye-box 120 over the eye 100 in the eye image may be optional. Edges of the eye image can be considered as edges of the eye-box 120. The eye image received can be considered to be inside an eye-box 120 with edges corresponding to edges of the eye image.

At block 416, a plurality of radial lines 128a can be generated from the pupil 116 (e.g., emanating from the center or around the center of the pupil 116) towards the top edge 124b1 of the eye-box 120 (for the upper eyelid 104a) or towards the bottom edge 124b2 of the eye-box 120 (for the lower eyelid 104b). A radial line 128a can be a line from the first pixel of the horizontal edge 124b1 closer to the upper eyelid 104a to the last pixel of the horizontal edge 124b2 closer to the lower eyelid 104b. A radial line 128a can be a line from the second pixel of the horizontal edge 124b1 closer to the upper eyelid 104a to the n−1 pixel of the horizontal edge 124b2 closer to the lower eyelid 104b, where n denotes the width of the eye-box 120.

The number of radial lines 128a (for each eyelid) may be as many as the width of the image, measured in pixels, or it may be a subsampling of this width. For example, a sampling process can be used to select certain radial lines to be used for eyelid shape estimation so that sufficient lines cross the eyelids to provide a good fit to the eyelid shape. In other embodiments, the number of radial lines 128a can be optimized to be the minimal number of lines (e.g., three) that allow the eyelid shape to be estimated within a certain error threshold. The number of lines can be representative of the typical angular range subtended by an eyelid in an eye image, which is typically less than 180 degrees (for each eyelid).

At block 420, candidate points 136a or 136b can be determined for the plurality of radial lines 128a. The candidate points 136a or 136b can be determined using, for example, edge detection. Edge detection can be applied by various edge detectors, edge detection algorithms, or filters. For example, a Canny Edge detector can be applied to the image to detect edges in lines of the image. Edges are points located along a line that correspond to the local maximum derivatives. The detected points can be referred to as candidate points. The edge detector can also detect and exclude points of non-interest from the candidate points. For example, points along the pupillary boundary 116a or the limbic boundary 112a can be excluded from the candidate points. Optionally, before applying edge detection, filters can be applied to the eye image to filter high-frequency noise. For example, a morphological open filter can be applied to the eye image.

At block 424, an eyelid shape curve is fitted to the candidate points. The eyelid shape curve can be a parabolic fit curve 140a that is parabolic in shape. A parabola can be fitted to pass through three (or more) candidate points 136a. For example, a random subset of three candidate points 136a is drawn from the list of candidate points 136a. The random subset can be selected via a random sampling process or method. A parabolic fit 140a can be made using the candidate points in the random subset. A parabolic fit curve 140c shows a fit of the lower eyelid 104b using a random subset of the candidate points 136b.

Optionally, at decision block 428, whether the eyelid shape curve is a preferred eyelid shape curve is determined. For example, the eyelid shape curve can be scored and compared to a score threshold. The score threshold can indicate an accurate estimation of the eyelid 104 shape within a certain error threshold. The Sobel derivative can be used to score the eyelid shape curve. For example, the eyelid shape curve can be scored by summing the Sobel derivative along each candidate point 136a or 136b along the eyelid shape curve. As another example of scoring, the eyelid shape curve can be scored by counting the number of candidate points 136a or 136b in total which are intersected by (or sufficiently close to, e.g., within a number of pixels) the eyelid shape curve. If the eyelid shape curve determined at block 424 is not a preferred eyelid shape curve, the block 424 is repeated. If the eyelid shape curve determined at block 4224 is a preferred eyelid shape curve, the process 400 proceeds to block 432.

At block 432, when the preferred eyelid shape curve is determined, the fitting of the eyelid shape curve can optionally be repeated using inlier points. Such a refitting process may provide a more accurate estimation of an eyelid shape as compared to the actual measurement of the eyelid 104. On completion of this refitting process, the eyelid shape curve fitted by the refitting process can be determined to be most representative of the eyelid boundary and selected as that eyelid boundary. Thereafter, at block 436, the process 400 ends.

Figure 5:
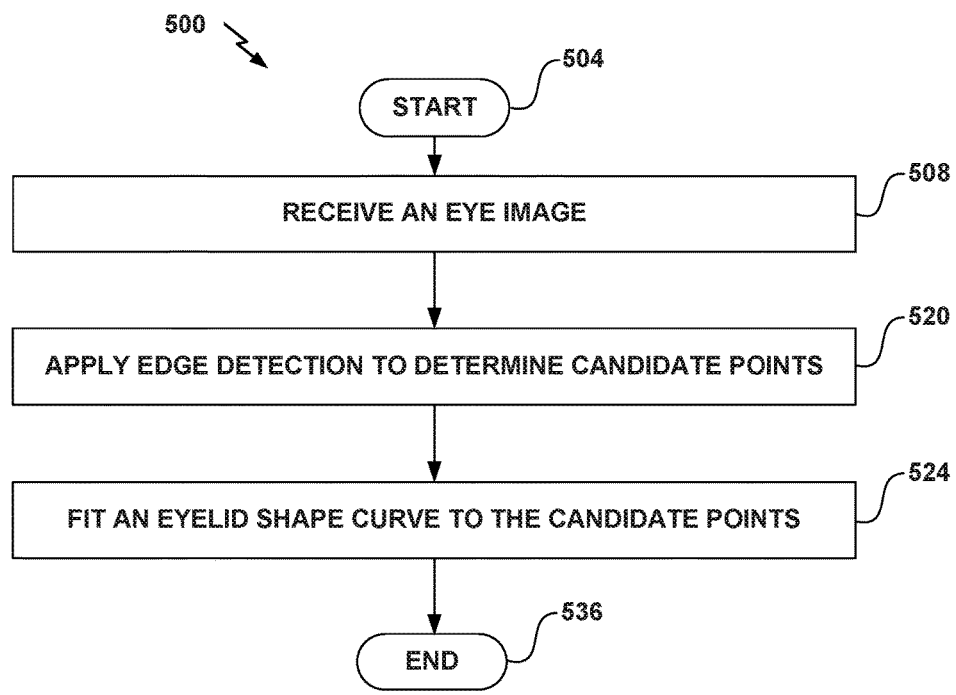
FIG. 5 is a flow diagram of another example process of eyelid shape estimation.

FIG. 5 is a flow diagram of another example process 500 of eyelid shape estimation. The process 500 may be implemented by a hardware processor. The process 500 begins at block 504. At block 508, an eye image is received. The eye image can be received from a variety of sources including, but not limited to: an image capture device, a head mounted display system, a server, a non-transitory computer-readable medium, or a client computing device (e.g., a smartphone).

At block 520, edge detection can be applied to the eye image to determine candidate points 136a or 136b. Edge detection can be applied by various edge detectors, edge detection algorithms, or filters. For example, a Canny Edge detector can be applied to the image to detect edges in lines of the image. Edges can be points located along a line that correspond to the local maximum derivatives. The detected points can be referred to as candidate points 136a or 136b. The edge detector can also detect and exclude points of non-interest from the candidate points. For example, points along a pupillary boundary 116a or a limbic boundary 112a can be excluded from the candidate points 136a or 136b. Optionally, before applying edge detection, filters can be applied to the eye image to filter high-frequency noise. For example, a morphological filter can be applied to the eye image.

At block 524, an eyelid shape curve 140a-140d can be fitted to the candidate points 136a or 136b. In various implementations, the eyelid shape curve 140a-140d can be fitted in accordance with various fitting processes as described above with reference to FIG. 3. Thereafter, at block 536, the process 500 ends.

In various embodiments, the processes 400 or 500 may be performed by a hardware processor of a head mounted display system. In other embodiments, a remote computing device with computer-executable instructions can cause the head mounted display system to perform the processes 400 or 500. In some embodiments of the processes 400 or 500, elements may occur in sequences other than as described above. One skilled in the art will appreciate that additional variations are possible and within the scope of the present disclosure.

Example Eyelid Shape Estimation Process Excluding Potential Candidate Points Along a Pupillary Boundary or a Limbic Boundary as Candidate Points In some embodiments, it may be advantageous to exclude potential candidate points along a pupillary boundary 116a or a limbic boundary 112a as candidate points 136a or 136b. Potential candidate points on or within a threshold distance (e.g., 2 pixels) of the pupillary boundary 116a or the limbic boundary 112a can be excluded as candidate points 136a or 136b. The remaining candidate points 136a or 136b can be used to determine the upper eyelid shape or the lower eyelid shape. If candidate points 136a or 136b used to determine an eyelid shape include points along the pupillary boundary 116a or the limbic boundary 112a, the eyelid shape determined may not be accurately. Furthermore, to determine an accurate eyelid shape, for example an eyelid shape above a score threshold, the candidate points may have to be sampled multiple times to determine multiple possible eyelid shape curves for an eyelid. Determining multiple possible eyelid shape curves for an eyelid requires more calculations and can be less efficient.

Figure 6:
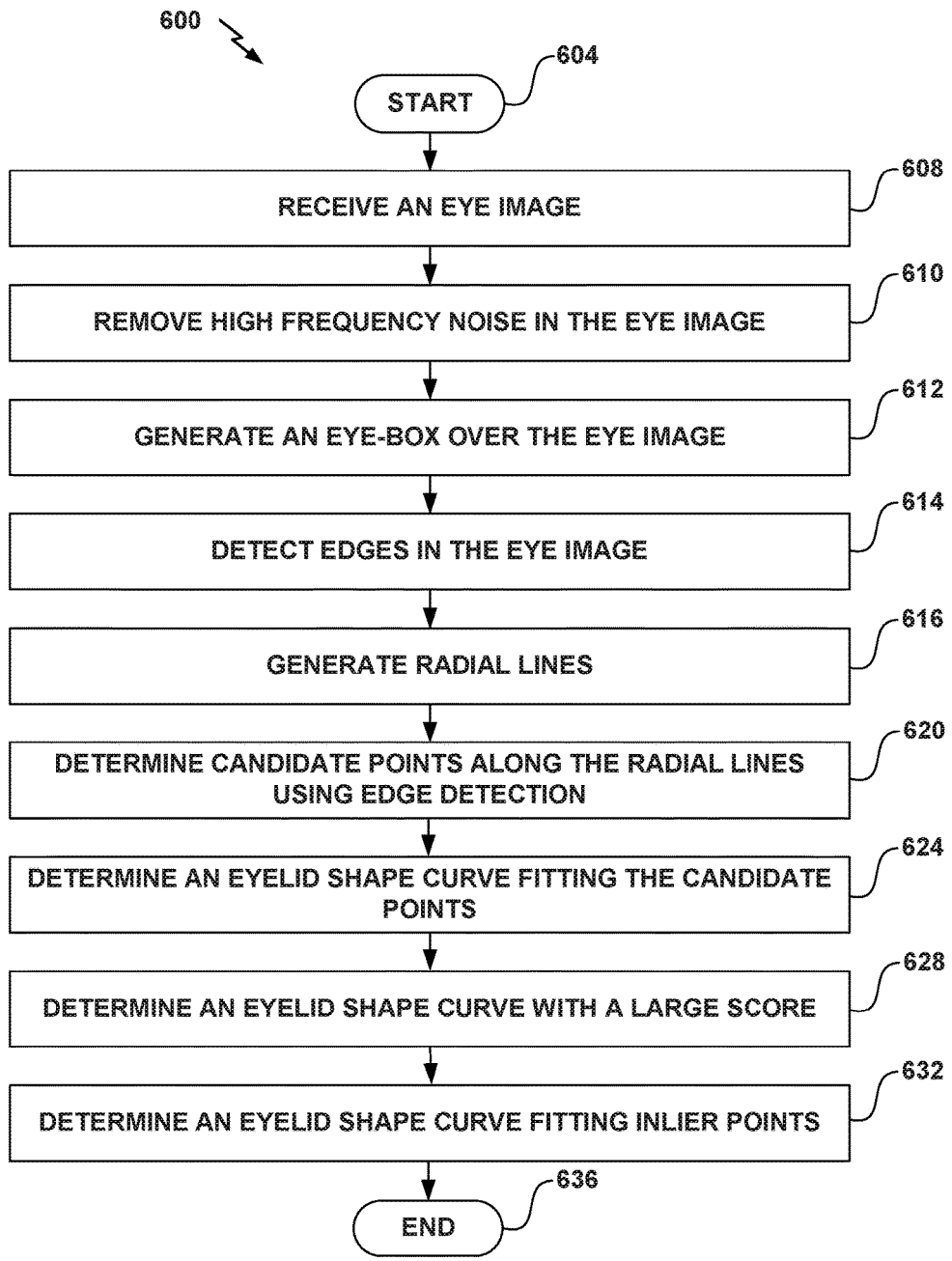
FIG. 6 is a flow diagram of an example process of eyelid shape estimation that excludes potential candidate points along a pupillary boundary or a limbic boundary as candidate points.

FIG. 6 is a flow diagram of an example process 600 of eyelid shape estimation that excludes potential candidate points along a pupillary boundary or a limbic boundary as candidate points. The process 600 starts at 604. At block 608, an eye image is received. The eye image can be received from an image capture device, a head mounted display system, a server, a non-transitory computer-readable medium, or a client computing device (e.g., a smartphone). A limbic boundary 112a in the eye image or a pupillary boundary 116a in the eye image can be received or determined at block 608. At block 610, the eye image can be optionally processed with a filter to remove high frequency noise (e.g., a morphological open filter).

At block 612, an eye-box 120 can be overlaid on the eye image such that the iris 112 (e.g., represented by the area between the limbic boundary 112a and the pupillary boundary 116a) is inside the boundary of the eye-box 120. In some implementations, the eyelids 104 or a part of the eyelids 104 can also be inside the boundary of the eye-box 120. The eye image can be cropped to have a minimal image size such that the iris 112 is inside the boundary of the eye-box. The shape of the eye-box 120 can be different in different implementations. For example, the eye-box 120 can be rectangular in shape. As with block 412 of the process 400, block 612 may be optional.

At block 614, edges in the eye image can be detected using an edge detector. The edges in the eye image may generally be representative of the pupillary boundary 116a, the limbic boundary 112a, and the eyelids 104. The edge detector can be a Canny edge detector. The edges in the eye image can be local maximum derivatives in the eye image. In some implementations, the local maximum derivatives can be pre-computed and stored in a look-up table.

At block 616, a plurality of radial lines 128a or vertical lines 128b can be generated inside the eye-box 120. The radial lines 128a emanate from the center or around the center of the pupil 116 towards the top edge 124b1 of the eye-box 120 and can be used to determine the upper eyelid 104a. In some implementations, the vertical lines 128b emanate from the bisector line 132 towards the top edge 124b1 and can be used to determine the upper eyelid 104a.

At block 620, candidate points 136a can be determined for the plurality of radial lines 128a. A candidate point 136a of a radial line 128a can be a point of the radial line 128a that intersects an edge in the eye image. The candidate point 136a can be determined using an edge detector. The candidate point 136a in the eye image can have a local maximum derivative in the eye image that can be optionally stored in a look-up table. Optionally, if a potential candidate point is along a pupillary boundary 116a or a limbic boundary 112a, then the potential candidate point can be excluded from the candidate points 136a. The potential candidate point can be on or within a threshold distance (e.g., 2 pixels) of the pupillary boundary 116a or the limbic boundary 112a. The remaining candidate points 136a can be used to determine the upper eyelid 104a.

At block 624, a mathematical fit to the eyelid shape can be determined from the candidate points 136a. For example, RANSAC or other optimization or fitting algorithm can be used. In one illustrative implementation, for some number of iterations, the following operations are performed. A subset of candidate points 136a can be selected. An eyelid shape curve can be fitted to the subset of candidate points 136a selected. The eyelid shape curve having a parabolic shape can be a parabolic fit curve 140a. In some implementations, the eyelid shape curve does not have a parabolic shape. The number of candidate points 136a that intersect the eyelid shape curve (or that lie within a threshold distance of the parabolic fit curve) can be determined as a score for the eyelid shape curve. In some implementations, the average distance of the candidate points 136a to the eyelid shape curve can be determined as a score of the eyelid shape curve. In the next iteration, a different subset of candidate points 136a can be used to determine the eyelid shape curve. These operations can be repeated for a number of iterations. The number of iterations can be a fixed number, or the operations can be iterated until an eyelid shape curve with more than a minimum number of inlier candidate points is found. An inlier candidate point can be a candidate point 136a that is within a threshold distance (e.g., a number of pixels) of the eyelid shape curve.

At block 628, the eyelid shape curve with a large score, for example the largest score, can be selected as the initial candidate eyelid shape curve. In some implementations, the initial candidate eyelid shape curve has a score that is sufficiently high (e.g., above a threshold) to be considered to accurately represent the eyelid shape.

Optionally, at block 632, inliers to the initial eyelid shape candidate curve can be identified. For example, inliers can include candidate points 136a on or within a threshold distance (e.g., a number of pixels) of the initial eyelid shape candidate curve. The remaining candidate points are outliers and are discarded as not being representative of eyelid shape. A new eyelid shape curve (e.g., a new parabolic fit curve 140a) can be determined by fitting some or all of the inlier points. The resulting eyelid shape curve can be considered the best estimate for the shape of the eyelid.

The process 600 can be repeated for the lower eyelid 104b. For example, blocks 620, 624, 628, and 632 of the process 600 can be repeated for the lower eyelid 104b. The order of determining the upper eyelid 104a and the lower eyelid 104b can be different in different implementations. For example, the shape of the upper eyelid 104a can be determined prior the shape of the lower eyelid 104b is determined. As another example, the shape of the lower eyelid 104b can be determined prior to the shape of the upper eyelid 104a is determined. As yet another example, the shape of the upper eyelid 104a and the shape of the lower eyelid 104b can be determined in parallel. The process 600 ends at block 636.

Example Applications of Eyelid Shape Estimation for Video Processing

Systems and methods using the eyelid shape estimation techniques disclosed herein can address or improve other solutions to the classical problems in image processing within the context of video imagery. Additionally other problems in image processing can be addressed. For example, the eyelid shape estimation techniques can be used for image classification of frames in a video (e.g., identifying the iris 112 of the eye), as well as for the localization of specific object types within one or more frames of the video (e.g., the location of the upper eyelid 104a). As another example, the eyelid shape estimation techniques can be applied to a video for the application of eye-tracking (e.g., determining the orientation or direction of an eye).

In some such applications, as will be further discussed below, a wearable display system can include a processor that performs eyelid shape estimation on video data acquired by an image capture device operatively coupled to (e.g., attached to or included in) the wearable display system. The image capture device may acquire video of the wearer's eye or other components of the wearer's body (e.g., a hand or a finger) for use in generating eye-boxes 120 or estimating eyelid shape based on the eyelid shape estimation techniques.

The use of the eyelid shape estimation techniques advantageously permits recognition of eyelids in a video (e.g., acquired from an image capture device in a wearable display system), which may permit improved recognition or classification of objects in the video such as biometric information. For example, a conventional iris segmentation technique may have difficulty in determining segmentation of the eye. However, the eyelid shape estimation techniques described herein can be used to better distinguish between the pupillary boundary 116a and the limbic boundary 112a, because (generally) a portion of the iris 112 will be occluded by an eyelid 104, whereas the pupil 116 (generally) will not be occluded. Thus, the eyelid shape estimation techniques, as illustrated in FIGS. 1-4, can be used to recognize portions of the eye 100 that are not occluded by the eyelid 104 and can provide for more accurate iris segmentation used in biometric extraction.

Example Wearable Display System

In some embodiments, a user device can be wearable, which may advantageously provide a more immersive virtual reality (VR), augmented reality (AR), experience, wherein digitally reproduced images or portions thereof are presented to a wearer in a manner wherein they seem to be, or may be perceived as, real.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. For example, displays containing a stack of waveguides may be configured to be worn positioned in front of the eyes of a user, or viewer. The stack of waveguides may be utilized to provide three-dimensional perception to the eye/brain by using a plurality of waveguides to direct light from an image injection device (e.g., discrete displays or output ends of a multiplexed display which pipe image information via one or more optical fibers) to the viewer's eye at particular angles (and amounts of divergence) corresponding to the depth plane associated with a particular waveguide.

In some embodiments, two stacks of waveguides, one for each eye of a viewer, may be utilized to provide different images to each eye. As one example, an augmented reality scene may be such that a wearer of an AR technology sees a real-world park-like setting featuring people, trees, buildings in the background, and a concrete platform. In addition to these items, the wearer of the AR technology may also perceive that he "sees" a robot statue standing upon the real-world platform, and a cartoon-like avatar character flying by which seems to be a personification of a bumble bee, even though the robot statue and the bumble bee do not exist in the real world. The stack(s) of waveguides may be used to generate a light field corresponding to an input image and in some implementations, the wearable display comprises a wearable light field display. Examples of wearable display device and waveguide stacks for providing light field images are described in U.S. Patent Publication No. 2015/0016777, which is hereby incorporated by reference herein in its entirety for all it contains.

Figure 7:
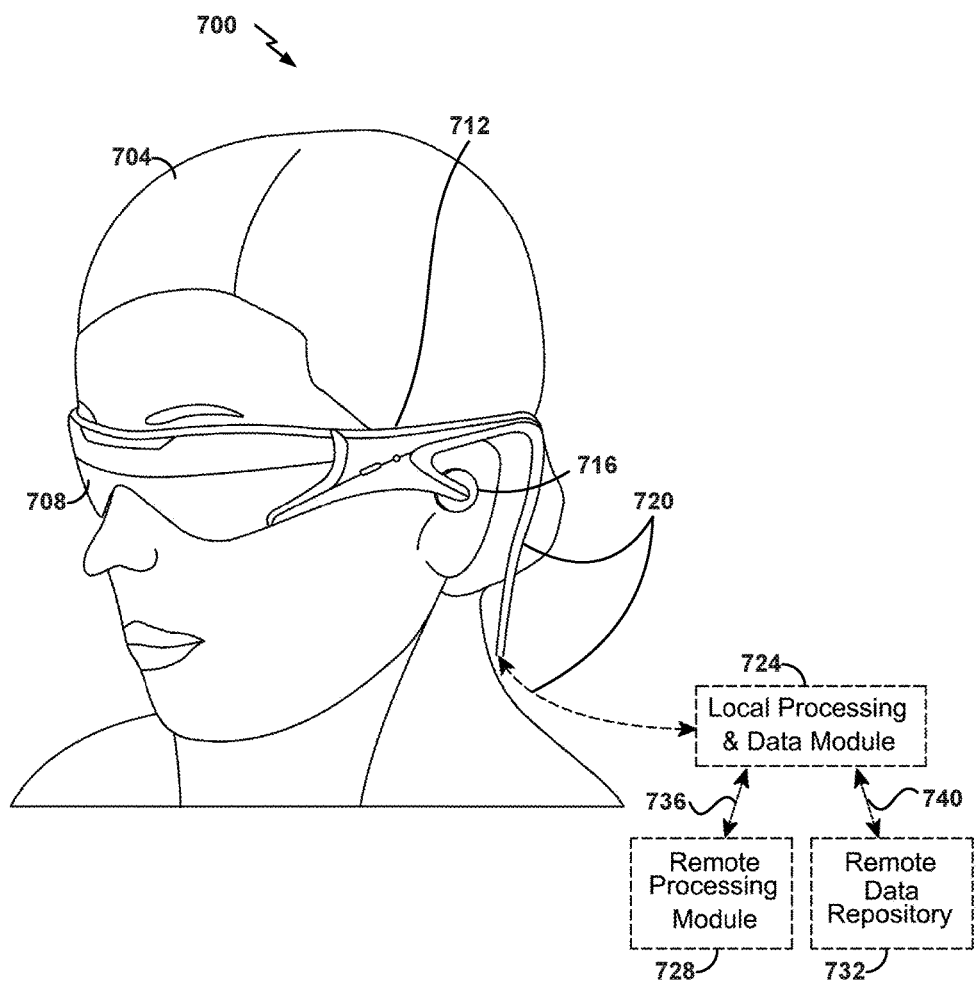
FIG. 7 schematically illustrates an example of a wearable display system

FIG. 7 illustrates an example of a wearable display system 700 that can be used to present a VR, AR, or MR experience to a display system wearer or viewer 704. The wearable display system 700 may be programmed to perform any of the applications or embodiments described herein (e.g., eye-box generation or eyelid shape estimation). The display system 700 includes a display 708, and various mechanical and electronic modules and systems to support the functioning of that display 708. The display 708 may be coupled to a frame 712, which is wearable by the display system wearer or viewer 704 and which is configured to position the display 708 in front of the eyes of the wearer 704. The display 708 may be a light field display. In some embodiments, a speaker 716 is coupled to the frame 712 and positioned adjacent the ear canal of the user in some embodiments, another speaker, not shown, is positioned adjacent the other ear canal of the user to provide for stereo/shapeable sound control. The display 708 is operatively coupled 720, such as by a wired lead or wireless connectivity, to a local data processing module 724 which may be mounted in a variety of configurations, such as fixedly attached to the frame 712, fixedly attached to a helmet or hat worn by the user, embedded in headphones, or otherwise removably attached to the user 704 (e.g., in a backpack-style configuration, in a belt-coupling style configuration).

The local processing and data module 724 may comprise a hardware processor, as well as non-transitory digital memory, such as non-volatile memory e.g., flash memory, both of which may be utilized to assist in the processing, caching, and storage of data. The data include data (a) captured from sensors (which may be, e.g., operatively coupled to the frame 712 or otherwise attached to the wearer 704), such as image capture devices (such as cameras), microphones, inertial measurement units, accelerometers, compasses, GPS units, radio devices, and/or gyros; and/or (b) acquired and/or processed using remote processing module 728 and/or remote data repository 732, possibly for passage to the display 708 after such processing or retrieval. The local processing and data module 724 may be operatively coupled to the remote processing module 728 and remote data repository 732 by communication links 736, 740, such as via a wired or wireless communication links, such that these remote modules 728, 732 are operatively coupled to each other and available as resources to the local processing and data module 724. The image capture device(s) can be used to capture the eye images used in the eyelid shape estimation procedures.

In some embodiments, the remote processing module 728 may comprise one or more processors configured to analyze and process data and/or image information such as video information captured by an image capture device. The video data may be stored locally in the local processing and data module 724 and/or in the remote data repository 732. In some embodiments, the remote data repository 732 may comprise a digital data storage facility, which may be available through the internet or other networking configuration in a "cloud" resource configuration. In some embodiments, all data is stored and all computations are performed in the local processing and data module 724, allowing fully autonomous use from a remote module.

In some implementations, the local processing and data module 724 and/or the remote processing module 728 are programmed to perform embodiments of generating an eye-box and estimating an eyelid shape as disclosed herein. For example, the local processing and data module 724 and/or the remote processing module 728 can be programmed to perform embodiments described herein. The local processing and data module 724 and/or the remote processing module 728 can be programmed to use the eyelid shape estimation techniques disclosed herein in biometric extraction, for example to identify or authenticate the identity of the wearer 704, or in eye gaze or pose estimation, for example to determine a direction toward which each eye is looking. The image capture device can capture video for a particular application (e.g., video of the wearer's eye for an eye-tracking application or video of a wearer's hand or finger for a gesture identification application). The video can be analyzed using the eyelid estimation techniques by one or both of the processing modules 724, 728 With this analysis, processing modules 724, 728 can perform eyelid shape estimation or detection and/or biometric extraction, eye pose determination, etc. In some cases, off-loading at least some of the eyelid shape estimation to a remote processing module (e.g., in the "cloud") may improve efficiency or speed of the computations. The parameters for eyelid shape estimation (e.g., weights, bias terms, random subset sampling factors, number, and size of filters (e.g., Sobel derivative operator), etc.) can be stored in data modules 724 and/or 732.

As an illustrative example of image processing, the processing module 724 can extract and formulate the biometric information from an eye image received from an image capture device into a numerical representation. The processing module 724 can also perform numerical calculations to represent an eye-box as a transfer function that transforms the biometric information extracted from an eye image into an image processing result. In turn, the image processing result can be used for further processing, for example, in eyelid shape estimation method as described herein. The image processing result and the transfer function can both be stored in the remote data repository 732. While this illustrative example of image processing is processed with the processing module 724, in various implementations, the remote processing module 728 can perform such image processing of an eye image. Additionally, the processing modules 724, 728 can, together perform such image processing of an eye image.

The results of the video analysis (e.g., the estimated shape of the eyelid) can be used by one or both of the processing modules 724, 728 for additional operations or processing. For example, in various applications, biometric identification, eye-tracking, recognition or classification of gestures, objects, poses, etc. may be used by the wearable display system 700. For example, video of the wearer's eye(s) can be used for eyelid shape estimation, which, in turn, can be used by the processing modules 724, 728 to determine the direction of the gaze of the wearer 704 through the display 708. The processing modules 724, 728 of the wearable display system 700 can be programmed with one or more embodiments of eye-box generation or eyelid shape estimation to perform any of the video or image processing applications described herein.

Additional Aspects

The eyelid shape estimation techniques described herein can be applied to an image (e.g., a video frame). Both eye-box generation and eyelid shape estimation can be viewed together as a single process and/or methodology for processing an image of an eye.

In a 1st aspect, a method for eyelid shape estimation is disclosed. The method is under control of a hardware processor and comprises: generating an eye box over an eye in an eye image, wherein the eye box is rectangular in shape with an upper edge and a lower edge, wherein the upper edge overlays a portion of an upper eyelid of the eye, and wherein the lower edge overlays a portion of a lower eyelid of the eye; generate a plurality of radial lines extending from approximately the center of the eye-box to the upper edge or the lower edge, determining candidate points on the plurality of radial lines using an edge detector; and determining a parabolic fit curve from a subset of the candidate points, wherein the parabolic fit curve is an estimation of an eyelid shape of the eye in the eye image.

In a 2nd aspect, the method of aspect 1, wherein the eye-box is square in shape.

In a 3rd aspect, the method of any one of aspects 1-2, further comprising: determining a score of the parabolic fit curve is above a threshold score; and determining that the parabolic line is a preferred estimation of the eyelid shape of the eye in the eye image.

In a 4th aspect, the method of aspect 3, wherein determining the score of the parabolic fit curve is above the threshold score comprises determining a number of the candidate points that intersect the parabolic fit curve.

In a 5th aspect, the method of aspect 3, wherein determining the score of the parabolic fit curve comprises determining a number of the candidate points that are within a threshold distance of the parabolic fit curve.

In a 6th aspect, the method of any one of aspects 1-5, wherein determining the candidate points on the plurality of radial lines using the edge detector comprises determining the candidate points on a subset of the plurality of radial lines using the edge detector.

In a 7th aspect, a head mounted display system is disclosed. The head mounted display comprises: an image capture device configured to capture an eye image of an eye; non-transitory memory; and a hardware processor in communication with the non-transitory memory, the hardware processor programmed to: receive the eye image from the image capture device; determine candidate points in the eye image; and determine an eyelid shape of the eye using a first subset of the candidate points.

In a 8th aspect, the head mounted display system of aspect 7, wherein determine the candidate points in the eye image comprises: identify a portion of the eye image comprising at least a portion of a pupil of the eye and an iris of an eye.

In a 9th aspect, the head mounted display system of aspect 8, wherein identifying the portion of the eye image comprises generating an eye-box over the portion of the pupil and the portion of the iris in the eye image.

In a 10th aspect, the head mounted display system of any one of aspects 7-9, wherein the non-transitory memory is configured to store an edge detector, and wherein determine the candidate points in the eye image comprises: generate an eye-box around an iris of the eye, wherein a first edge of the eye-box is tangent to a limbic boundary of the eye; generate a plurality of lines extending to a second edge of the eye-box; and determine the candidate points on the plurality of lines using the edge detector.

In a 11th aspect, the head mounted display system of aspect 10, wherein generate the eye-box around the iris of the eye comprises overlaying an eye-box over the eye in the eye image.

In a 12th aspect, the head mounted display system of aspect 10, wherein the plurality of lines comprises a plurality of radial lines, and wherein the plurality of radial lines extends from approximately the center of the eye-box to the second edge of the eye-box.

In a 13th aspect, the head mounted display system of aspect 12, wherein the pupil of the eye is at approximately the center of the eye-box.

In a 14th aspect, the head mounted display system of any one of aspects 10-13, wherein the plurality of lines comprises a plurality of vertical lines, and wherein the plurality of vertical lines extends from a bisector line of the eye-box to the second edge of the eye-box.

In a 15th aspect, the head mounted display system of aspect 14, wherein the bisector lines passes through the pupil of the eye in the eye image.

In a 16th aspect, the head mounted display system of any one of aspects 10-15, wherein the candidate points comprise points with local maximum derivatives along the plurality of the lines.

In a 17th aspect, the head mounted display system of any one of aspects 10-16, wherein the candidate points are not along a pupillary boundary or a limbic boundary.

In a 18th aspect, the method of any one of aspects 10-17, wherein the hardware processor is further programmed to: apply a morphological filter to the eye image prior to determining the candidate points.

In a 19th aspect, the head mounted display system of any one of aspects 7-18, wherein determine the eyelid shape using the first subset of the candidate points comprises determine a functional form of the eyelid shape using the first subset of the candidate points.

In a 20th aspect, the head mounted display system of aspect 19, wherein the functional form is a parabola or a polynomial.

In a 21st aspect, the head mounted display system of any one of aspects 7-20, wherein determine the eyelid shape using the first subset of the candidate points comprises re-determine the eyelid shape using a second subset of the candidate points if the determined eyelid shape has a negative curvature and the determined eyelid shape is an estimation of the upper eyelid or if the determined eyelid shape has a positive curvature and the determined eyelid shape is an estimation of the lower eyelid.

In a 22nd aspect, a method for eyelid shape estimation is disclosed. The method is under control of a hardware processor and comprises: identifying a portion of an eye image comprising at least a portion of a pupil and an iris of an eye; generating a plurality of lines extending to an upper edge or a lower edge of the portion of the eye image; determining candidate points on the plurality of lines using an edge detector; and determining an eyelid shape using a subset of the candidate points.

In a 23rd aspect, the method of aspect 22, wherein determining the eyelid shape using the subset of the candidate points comprises: determining a first functional form of the eyelid shape using a first subset of the candidate points; determining a second functional form of the eyelid shape using a second subset of the candidate points; determining a score of the first functional form of the eyelid shape; determining a score of the second functional form of the eyelid shape; and determining a preferred estimation of the eyelid shape is the first functional form of the eyelid shape if the score of the first functional form is greater than the score of the second functional form, and the second functional form of the eyelid shape otherwise.

In a 24th aspect, the method of any one of aspects 22-23, further comprising: randomly sample the candidate points to generate the subset of the candidate points.

In a 25th aspect, the method of any one of aspect 22-24, wherein the edge detector comprises a Sobel filter, and wherein determining the candidate points on the plurality of lines using the edge detector comprises: convolving the Sobel filter with the eye image to generate a derivative approximation image result; and identifying the candidate points using the derivative approximation image result.

In a 26th aspect, the method of any one of aspects 22-25, wherein identifying the portion of the eye image comprises generating an eye-box over the eye in the eye image.

In a 27th aspect, a method for processing an eye image is disclosed. The method is performed under control of a hardware computer processor and comprises: generating lines extending to an upper edge or a lower edge of an eye-box bounding an iris of an eye in an eye image; selecting candidate points of maximum derivatives for the lines; and determining a best-fit curve matching a shape of an eyelid of the eye in the eye image.

In a 28th aspect, the method of aspect 27, wherein the lines comprise radial lines from a center of a pupil of the eye in the eye image extending to the upper edge or the lower edge of the eye-box bounding the iris of the eye in the eye image, and wherein the candidate points are maximum parallel Sobel directional derivatives for the radial lines In a 29th aspect, the method of any one of aspects 27-28, wherein the lines comprise vertical lines from a horizontal bisecting line through a pupil of the eye in the eye image extending to the upper edge or the lower edge of the eye-box bounding the iris of the eye in the eye image, and wherein the candidate points are maximum vertical Sobel derivatives for the vertical lines.

In a 30th aspect, the method of any one of aspects 27-29, wherein determining the best-fit curve matching the shape of the eyelid of the eye in the eye image comprises: randomly sampling the candidate points to generate a subset of the candidate points; determining the best-fit curve matching the shape of the eyelid using the subset of the candidate points.

In a 31st aspect, the method of any one of aspects 27-30, wherein the best-fit curve has a maximum number of candidate points on or close to the best-fit curve.

In a 32nd aspect, the method of aspect 31, wherein the maximum number of candidate points on or close to the best-fit curve is above a maximum number of candidate points threshold.

In a 33rd aspect, the method of any one of aspects 27-30, wherein the best-fit curve has a maximum integrated Sobel derivative along the best-fit curve.

In a 34th aspect, the method of aspect 33, wherein the maximum integrated Sobel derivative along the best-fit curve is above a Sobel derivative threshold.

In a 35th aspect, the method of any one of aspects 27-34, further comprising applying a morphological filter before selecting the candidate points.

In a 36th aspect, the method of aspect 35, wherein the morphological filter is an open morphological filter.

In a 37th aspect, the method of any one of aspects 27-36, further comprising: rejecting a candidate curve of the best-fit curve having an incorrect curvature.

In a 38th aspect, the method of aspect 37, wherein the candidate curve of the best-fit curve has the incorrect curvature if the candidate curve has a positive curvature, and wherein the eyelid is an upper eyelid.

In a 39th aspect, the method of aspect 37, wherein the candidate curve of the best-fit curve has the incorrect curvature if the candidate curve has a negative curvature, and wherein the eyelid is a lower eyelid.

In a 40th aspect, the method of any one of aspects 27-39, further comprising: pre-computing the maximum derivatives for the lines; and storing the maximum derivatives in a look-up table.

In a 41st aspect, the method of aspect 40, wherein selecting the candidate points with the maximum derivatives for the lines comprises selecting the candidate points using the look-up table.

CONCLUSION

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method for eye tracking, comprising:
  under control of a hardware processor:
    generating an eye-box over an eye in an eye image for determining an eye pose of the eye in the eye image, wherein the eye pose comprises a direction toward which the eye is looking, wherein the eye-box has an upper edge and a lower edge, wherein the upper edge overlays a portion of an upper eyelid of the eye, and wherein the lower edge overlays a portion of a lower eyelid of the eye;
    generating a plurality of radial lines extending from approximately the center of the eye-box to the upper edge or the lower edge;
    determining candidate points on the plurality of radial lines using an edge detector;
    determining parameters of a parabolic fit curve from a subset of the candidate points, wherein the parabolic fit curve is an estimation of an eyelid shape of the eye in the eye image;
    determining a score of the parabolic fit curve is above a threshold score using the parameters of the parabolic fit curve;
    determining that the parabolic fit curve is a preferred estimation of the eyelid shape of the eye in the eye image; and
    determining the eye pose of the eye in the eye image using parameters of the preferred estimation of the eyelid shape; and
    tracking the eye in the eye image using the eye pose of the eye in the eye image.

2. The method of claim 1, wherein the eye-box is rectangular or square in shape.

3. The method of claim 1, wherein determining the score of the parabolic fit curve is above the threshold score comprises determining a number of the candidate points that intersect the parabolic fit curve.

4. The method of claim 1, wherein determining the score of the parabolic fit curve comprises determining a number of the candidate points that are within a threshold distance of the parabolic fit curve.

5. The method of claim 1, wherein determining the candidate points on the plurality of radial lines using the edge detector comprises determining the candidate points on a subset of the plurality of radial lines using the edge detector.

6. A head mounted display (HMD) system comprising:
  an image capture device for tracking an eye pose of an eye of a wearer of the HMD system in an eye image of the eye of the wearer, wherein the eye pose comprises a direction toward which the eye is looking;
  non-transitory memory configured to store the eye image and an edge detector;
  a display for providing virtual image information to the wearer of the HMD system based on the eye pose of the wearer in the eye image; and
  a hardware processor in communication with the non-transitory memory, the hardware processor programmed to:
    receive the eye image from the image capture device;
    generate an eye-box around an iris of the eye, wherein a first edge of the eye-box is tangent to a limbic boundary of the eye;
    generate a plurality of lines extending to a second edge of the eye-box;
    determine candidate points on the plurality of lines in the eye image using the edge detector;
    determine parameters of an eyelid shape of the eye using a first subset of the candidate points;
    determine the eye pose of the eye using the parameters of the eyelid shape of the eye;
    determine the virtual image information to be provided to the wearer of the HMD using the eye pose of the eye; and
    cause the display to provide the virtual image information to the wearer of the HMD system.

7. The head mounted display system of claim 6, wherein the plurality of lines comprises a plurality of radial lines, and wherein the plurality of radial lines extends from approximately the center of the eye-box to the second edge of the eye-box.

8. The head mounted display system of claim 6, wherein the plurality of lines comprises a plurality of vertical lines, and wherein the plurality of vertical lines extends from a bisector line of the eye-box to the second edge of the eye-box.

9. The head mounted display system of claim 6, wherein the candidate points comprise points with local maximum derivatives along the plurality of the lines.

10. The head mounted display system of claim 6, wherein the candidate points are not along a pupillary boundary or a limbic boundary.

11. The method of claim 6, wherein the hardware processor is further programmed to: apply a morphological filter to the eye image prior to determining the candidate points.

12. The head mounted display system of claim 6, wherein determine the eyelid shape using the first subset of the candidate points comprises determine a functional form of the eyelid shape using the first subset of the candidate points.

13. The head mounted display system of claim 12, wherein the functional form is a parabola or a polynomial.

14. The head mounted display system of claim 6, wherein determine the eyelid shape using the first subset of the candidate points comprises re-determine the eyelid shape using a second subset of the candidate points if the determined eyelid shape has a negative curvature and the determined eyelid shape is an estimation of the upper eyelid or if the determined eyelid shape has a positive curvature and the determined eyelid shape is an estimation of the lower eyelid.

15. A method for eye tracking, the method comprising:
under control of a hardware processor:
identifying a portion of an eye image comprising at least a portion of a pupil and an iris of an eye;
generating a plurality of lines extending to an upper edge or a lower edge of the portion of the eye image;
determining candidate points on the plurality of lines in the eye image using an edge detector; and
determining parameters of an eyelid shape of the eye in the eye image using a subset of the candidate points comprising:
determining a first functional form of the eyelid shape using a first subset of the candidate points;
determining a second functional form of the eyelid shape using a second subset of the candidate points;
determining a score of the first functional form of the eyelid shape;
determining a score of the second functional form of the eyelid shape; and
determining a preferred estimation of the eyelid shape is the first functional form of the eyelid shape if the score of the first functional form is greater than the score of the second functional form, and the second functional form of the eyelid shape otherwise; and
determining an eye pose of the eye in the eye image using parameters of the preferred estimation of the eyelid shape, wherein the eye pose comprises a direction toward which the eye is looking; and
tracking the eye in the eye image using the eye pose of the eye in the eye image.

16. The method of claim 15, further comprising:
randomly sampling the candidate points to generate the subset of the candidate points.

17. The method of claim 15, wherein the edge detector comprises a Sobel filter, and wherein determining the candidate points on the plurality of lines using the edge detector comprises:
convolving the Sobel filter with the eye image to generate a derivative approximation image result; and
identifying the candidate points using the derivative approximation image result.

18. The method of claim 15, wherein identifying the portion of the eye image comprises generating an eye-box over the eye in the eye image.

* * * * *

UNITED STATES PATENT AND TRADEMARK OFFICE
CERTIFICATE OF CORRECTION

PATENT NO. : 10,089,526 B2
APPLICATION NO. : 15/238549
DATED : October 2, 2018
INVENTOR(S) : Gholamreza Amayeh et al.

It is certified that error appears in the above-identified patent and that said Letters Patent is hereby corrected as shown below:

On the Title Page

On Page 2, Column 2, Item (56), Line 12, under Other Publications, change "(BldS)," to --(BIdS),--

In the Specification

In Column 2, Line 10 (Approx.), change "system" to --system.--

In Column 15, Line 21, change "728 With" to --728. With--

In Column 18, Line 27, change "lines" to --lines.--

In the Claims

In Column 23, Line 10 (Approx.), in Claim 11, change "method" to --head mounted display system--

Signed and Sealed this
Fourteenth Day of May, 2019

Andrei Iancu
*Director of the United States Patent and Trademark Office*